United States Patent Office 3,056,280
Patented Oct. 2, 1962

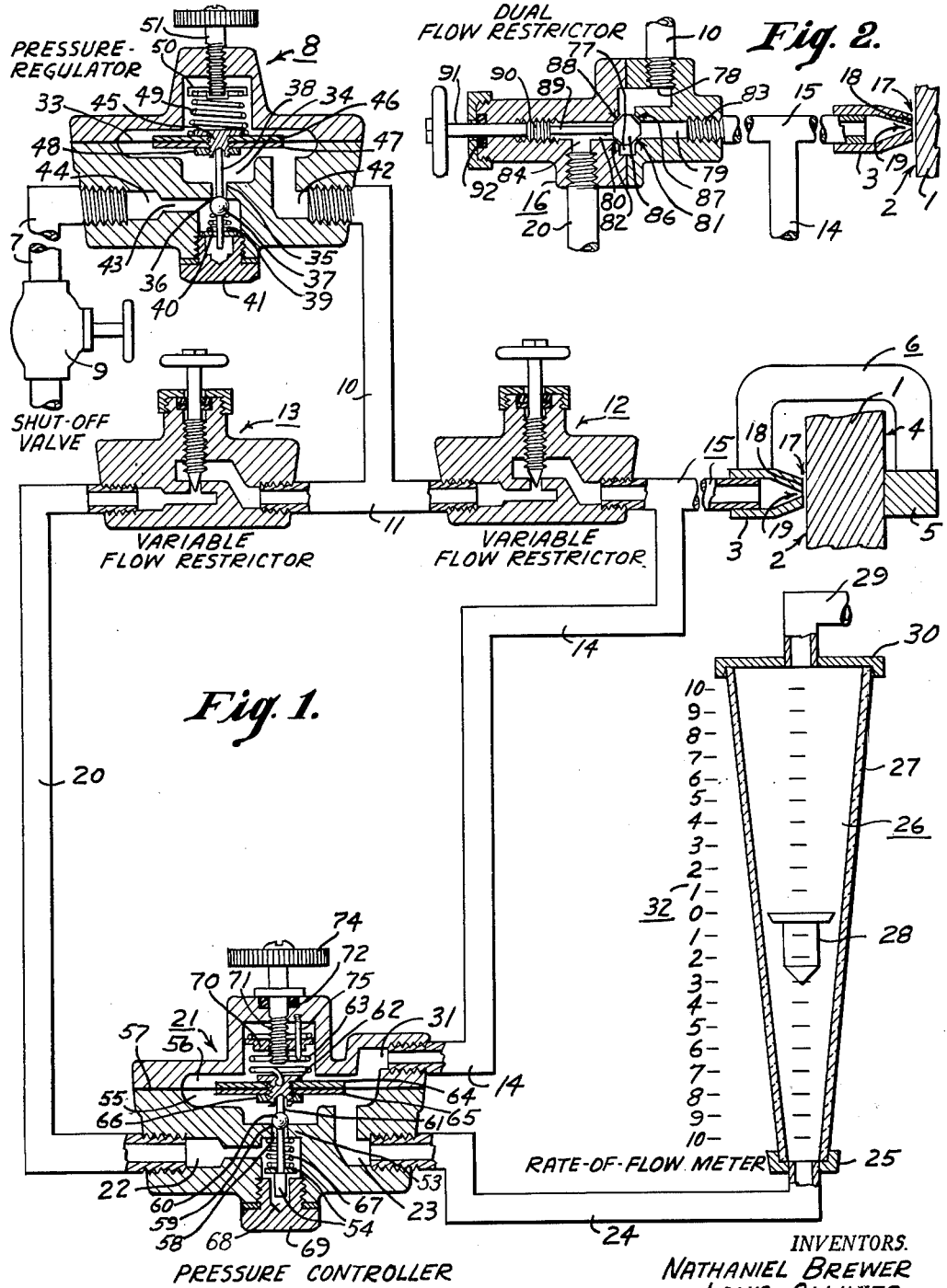

3,056,280
PNEUMATIC SYSTEMS FOR GAUGING LINEAR DIMENSIONS
Nathaniel Brewer, Newtown, and Louis Ollivier, Hatboro, Pa., assignors to Fischer & Porter Company, Warminster Township, Bucks County, Pa., a corporation of Pennsylvania
Filed Oct. 22, 1957, Ser. No. 691,644
5 Claims. (Cl. 73—37.5)

The present invention relates to a pneumatic system for accurately measuring or gauging small differences in the external or internal linear dimensions of work-pieces or mechanical elements, for inspection and quality-control either in the course of their manufacture or thereafter, or for controlling automatic production or processing equipment by the dimension of the work-piece.

Pneumatic systems for so measuring or gauging linear dimensions have been used before. In such practice the measurement-sensing element, work-gauge or "head" includes an air-escape nozzle or air-escape orifice which is applied to the work-piece or mechanical element to be measured, as, for instance, by making the air-escape nozzle one side or one "jaw" of a C type gauge (similar to a C type micrometer) with the distance between the other jaw or "anvil" of the C gauge and the air-escape nozzle or sensing element fixed at slightly greater (by perhaps a thousandth of an inch, more or less) than the desired dimension or specified dimension of the work-piece to be gauged. For gauging internal dimensions the air-escape nozzle may be in a "plug" inserted into the bore to be gauged. Air is passed through the air-escape nozzle of the "head" while the work-piece is between it and the anvil, and the deviation of the work-dimension from the gauge-dimension is indicated by the extent of air-escape between the work-piece and the nozzle; such air-escape being indicated either by pressure-drop or by rate-of-flow.

The air-escape nozzle or sensing element may be either of the direct type which discharges the air directly against the work-surface being measured and wherein the clearance between the nozzle and the work-surface constitutes the final air-escape orifice whose effective area or size varies with the variations in such clearance, or the air-escape nozzle may be of the plunger type or internal escape-valve type in which the sensing device or "head" includes a movable plunger or like work-contacting feeler constituting a part thereof (and which is carried by a stationary portion of the sensing "head"), and in which the movement of the plunger or feeler similarly regulates the size or area of a small valve-like air-escape orifice within the sensing "head," in accordance with deviation of the work-dimension from gauge-dimension, so that the air-escape is not directly against the work-surface but is through an air-escape valve in the sensing head controlled by the movement of the work-contacting plunger or mechanical "feeler" element which bears against the work-surface to be gauged.

The object of the present invention is a pneumatic system for measuring the air-escape (between the work-surface and the measurement-sensing nozzle or through the air-escape valve of a plunger type measurement-sensing "gauge-head" applied to the work-piece), which will provide an adequate range of adjustment of magnification, gain or sensitivity, and which will provide an effective and convenient zero-setting, and which will have adequate speed of response and stability and which will be reliable under operating conditions.

In the accompanying drawings, in which like reference numerals indicate like parts:

FIGURE 1 represents a diagrammatic or schematic view of a pneumatic system for air-gauging linear dimensions, representing one embodiment of the present invention.

FIGURE 2 represents a modified form of flow-restrictor, which may be used in and as a part of the aforementioned system in lieu of the flow-restrictors 12 and 13 shown in FIGURE 1.

These drawings are for the purpose of illustrating the invention, and it is to be understood that the various instrumentalities of which the invention consists can be variously arranged and organized and that the invention is not limited to the precise arrangement and organization of the instrumentalities as therein shown and hereinafter described.

In the accompanying drawing, the work-piece is designated generally by the numeral 1, and the work-surface to which the air-escape nozzle, sensing-head or work-feeler is applied is designated by the numeral 2, and the sensing nozzle is designated by the numeral 3. It is to be understood that the work-piece 1 may be of any character or shape, and that the surface 2 thereof may be either an external or an internal surface and may be either flat, cylindrical or any other shape. In the illustration shown in the drawing the work-piece is represented as having external surfaces 2 and 4, whose linear distance, one from the other, is to be gauged. The surface 4 of the work-piece bears against or is supported by an anvil or like stationary element 5 juxtaposed to the sensing nozzle 3; the anvil 5 and the nozzle 3 being stationary in relation to each other so that the distance between them is the gauging distance or the gauging dimension, and together they form the gauging "head" in the C type gauge 6 shown for purposes of illustration.

In the embodiment of the invention shown, compressed air (or other compressed gas), at a pressure suitably higher than the system pressure, is supplied through the supply-line 7 to an adjustable pressure-regulator 8, through a shut-off valve 9, the pressure-regulator being adjusted to deliver air to the system at a selected constant pressure, which may be, for example, 15 to 20 p.s.i.g. The air from the pressure-regulator 8 (at the selected constant pressure) passes through the line or conduit 10 to a pair of manually-adjustable flow-restrictors, which may be variable orifices, such as, for example, the needle-valves 12 and 13, through a branching line or conduit 11 (FIGURE 1); to the downstream sides of which the point-of-measurement line 15 and the indicator line 20 (respectively) are connected.

In FIGURE 2 a modified form of flow-restrictor 16 is shown, which may be used in and as a part of the system of the present invention, in lieu of flow-restrictors 12 and 13 (of FIGURE 1) intermediate the downstream side of the pressure-regulator 8 and the point-of-measurement line 15 and the indicator line 20; whereby the flow-restrictions intermediate the downstream side of the pressure-regulator and the point-of-measurement line 15 and indicator line 20 (respectively) may be simultaneously adjusted relative to each other.

The modified form of flow restrictor 16, shown in FIGURE 2, includes a valve-chamber 77 communicating with the inlet 78 to which the downstream side of the pressure-regulator 8 is connected (through the conduit or line 10) and a pair of valved passageways 79 and 80, at whose inner ends the facing valve-seats 81 and 82 are disposed, and which terminate in corresponding outlets 83 and 84; the point-of-measurement line 15 being connected to the outlet 83 and the indicator line 20 being connected to the outlet 84. A valve member 86, having opposed valve or closure surfaces 87 and 88, is provided on a valve-stem 89 carried by a screw-threaded operating shaft 90, whose handle-extension 91 extends through a suitable stuffing gland 92 which forms an airtight seal between it and the body of the flow-restrictor 16. The axial distance between the two annular valve surfaces or closure surfaces 87 and 88 of the valve member 86 is just sufficiently less than the axial distance between the facing valve-seats 81 and 82 that by moving the valve-member 86 axially from one seat to the other, the entire desired range of relative flow-restrictions upon the point-of-measurement line 15 and upon the indicator line 20 may be encompassed.

At the end of the point-of-measurement line is the measurement-sensing nozzle 3 or the measurement-sensing air-escape orifice. In the illustration shown, the measurement-sensing air-escape at the work-measurement point is the orifice 17 formed by the clearance between the work-surface 2 and the end 18 of the nozzle 3 through which the nozzle-opening 19 extends.

The indicator line 20 goes to the inlet 22 of an adjustable pressure-controller 21, while the outlet 23 of said pressure-controller is connected through the indicator line or conduit 24 with the lower end-fitting 25 of the rate-of-flow meter designated generally by the numeral 26. In the embodiment shown, the rate-of-flow meter is of the variable-area type including a suitably calibrated tapered metering-tube 27 and a metering-head or metering-float 28 therein; the position of the metering-float in the tapered tube, in relation to the calibration-scale 32 thereof, indicating the rate-of-flow of air passing upwardly through the tapered tube and the conformance of the work-piece to the gauge-dimension (if the float is at the zero point of the scale) or the deviation of the work-piece from the gauge-dimension by the extent to which the float is above or below the zero point of the scale. The top of the metering tube 27 is vented to the atmosphere through any suitable outlet or vent opening 29 in the upper tube-fitting 30 of the rate-of-flow meter 26.

A pilot line or conduit 14 extends from point-of-measurement line 15 (or from the indicator line 20 in free communication therewith) to the control inlet 31 of the pressure-controller 21.

The pressure regulator 8 may be of any suitable construction, as, for instance, that shown in the drawing, wherein a diaphragm 33 constitutes a flexible and movable wall of the pneumatic chamber 34, the inlet 35 of which is through the valve-seat 36 against which the movable valve 37, carried by the valve-stem 38, is adapted to seat. The valve 37 is urged in its seating direction by the valve-closing spring 39 whose stationary end is supported by a spring-seat 40 in or on the closure-plug 41 which is threaded into the body of the regulator 8 and sealed thereto by a suitable gasket or the like. The pneumatic chamber 34 has an outlet 42 to which the line or conduit 10 is connected, while the inlet chamber 43 has an inlet 44 to which the supply line or conduit 7 is connected. The upper end of the valve-stem 38 nests in the stem-receiving cavity or socket in the diaphragm-assembly plug 45 which extends through the discs 46 and 47 which flank the diaphragm 33 and which is secured by the nut 48. The lower end of the valve-stem 38 may extend through a guide-hole in the spring-seat 40, which may be a washer. The helical compression spring 49 is interposed between a spring-anchorage 50 carried by the adjustment screw 51 and the disc 46 or the top of the assembly-plug 45, so as to urge the diaphragm 33 and hence the plug 45 and the valve-stem 38 towards the pneumatic chamber 34, thereby to tend to unseat the valve 37 and to permit the flow of air from the supply-line 7 to the outlet 42 and hence through the line 10 to the flow-restrictor 12, and through the latter to the point-of-measurement line 15 and to the indicator line (20 and 24). As the pressure in the line 10 decreases, the pressure in the pneumatic chamber 34 correspondingly decreases and the spring 49 over-balances the so reduced air-pressure within the chamber 34 and moves the diaphragm 33 and the valve-stem 38 to unseat the valve 37 so as to admit air at the higher supply-pressure into the chamber 34 and hence into the line 10, until the pressure in the line 10 and hence in the chamber 34 is of such magnitude that when applied to the diaphragm 33 (and augmented by the force of the spring 39) it will balance the force of the spring 49, so as to seat or tend to seat the valve 37 against its seat 36. In this manner, a predetermined pressure is maintained generally constant in the line 10, as, for instance, a pressure of 15 or 20 pounds (the supply-pressure provided through the shut-off valve 9 and the supply-conduit 7 being substantially greater than the pressure desired in the line 10).

The variable orifices or flow-restrictors 12 and 13 may be of any conventional construction or arrangement, as, for instance, the needle-valves 12 and 13 shown in FIGURE 1 of the drawing. These variable flow-restrictors, such as needle-valves 12 and 13 (or the dual flow-restrictor 16) may be included in the main body of the pressure-regulator 8, as, for instance, in the passageway between the chamber 34 and the outlet 42 thereof.

The pressure-controller 21 includes opposed pneumatic chambers 55 and 56 separated by the diaphragm 57, with the outlet 23 communicating with the chamber 55 and with the pilot-inlet 31 communicating with the chamber 56. A valved passageway 58 is provided in the wall between the pneumatic chamber 55 and the inlet 22, and the outer-periphery 59 of said passageway 58 may serve as a valve-seat for the valve 60 carried by the valve-stem 61. The inner end of the valve-stem 61 nests in the stem-receiving recess or socket in the diaphragm-assembly plug or member 62 which also serves as a spring-anchorage for the helical tension spring 63, and which extends through the discs 64 and 65 which flank the diaphragm 57 and which are held in assembled relation by the nut 66 threaded onto the projecting end of the plug 62. The enlarged outer end 54 of the valve-stem 61 (which serves as an abutment for the lower end of the spring 67) may be guided in any suitable guide-hole 68 in the plug 69 which is screw-threaded into the body of the pressure-controller and is sealed thereto by any suitable gasket or the like, in the manner indicated in the drawing. A helical compression spring 67 interposed between the underside of the partition wall 53 and the spring-abutment 54 carried by the valve-stem 61, urges the valve 60 (carried by said valve-stem) towards its valve-seat 59. The inner end of the helical tension spring 63 is secured to the assembly member 62 in any suitable manner, and the outer end thereof is secured to the non-revoluble spring-anchorage 70 through which the adjustment-screw 71 is screw-threaded for varying the pull of the spring 63 upon the diaphragm-assembly member 62 according to the position to which the spring-anchorage 70 is moved by the screw 71; spring-anchorage 70 being keyed to the housing by any suitable keying means, as, for instance the stationary pin 75 carried by the housing and slidably extending through a hole in the spring-anchorage. The stem of the screw 71 extends through the upper housing member of the pressure-controller and is provided with any suitable seal 72, to seal it in relation to the housing while permitting it to be rotated. A thrust flange is suitably affixed to the stem of the screw 71 and bears against the outside of the housing, so as to permit the screw 71 to pull the spring-anchorage 70 against the force of the spring 63. Any suitable handle 74 affixed to the stem of the screw 71 serves to permit the convenient turning of the screw to adjust the force of the spring 63.

The pressure on the downstream sides of the flow-restrictors 12 and 13 (or on the downstream sides 83 and 84 of the flow-restrictor 16) is less than the pressure on the upstream side thereof, according to the adjustment of the flow-restrictors and the adjustment of the flow-controller 21. Thus, for example, the pressure on the downstream side of the flow-restrictor 12 (and hence in the point-of-measurement line 15 and in the indicator line 20) may be set at 5 to 10 p.s.i.g.

As the pressure in the point-of-measurement line 15 increases with the reduction of the clearance 17 (or with the decrease in the difference between work-dimension and gauge dimension), the pressure in the pilot chamber 56 increases correspondingly, and such increased pressure, acting upon the diaphragm 57, over-balances the pull of the spring 63 and so seats the valve 60 on its seat 59 or moves the valve 60 closer to the seat 59 and thus reduces the flow of air through the indicator line 20 into the pneumatic chamber 55 and through the rate-of-flow meter 26, and so maintains the flow-rate through the meter 26 proportional to the flow-rate through point-of-measurement orifice 17.

Conversely, as the pressure in the point-of-measurement line 15 decreases with an increase of the clearance 17 (or with the increase of the difference between work-dimension and gauge-dimension), the pressure in the pilot chamber 56 also decreases and such decrease in pressure permits the spring 63 to unseat the valve 60 from the seat 59 or to move it further away from the seat 59 and thus increases flow-rate through the indicator line (20 and 24) and meter 26.

In the system of the present invention the indicator line (including 20 and 24 and the pressure-controller 21 and the rate-of-flow meter 26) constitutes an air-escape line paralleling the point-of-measurement line composed of the line 15 and the point-of-measurement orifice 17. Each of these two parallel lines is vented to the atmosphere. The rate-of-flow meter 26 operates at all times at substantially atmospheric pressure.

In the system of the present invention the indicator-line 20 does not bleed air from the point-of-measurement line 15 but only establishes a flow-line parallel to the flow-line through the point-of-measurement line 15 and orifice 17.

In the system of the present invention the rate of flow of air through the point-of-measurement line 15 as well as the rate-of-flow through the indicator line 20 varies with the clearance 17, as does the pressure in the lines 15 and 20 vary with such clearance.

The flow through the indicator line is proportional to the flow through the point-of-measurement line, and the ratio of flow through these two lines is adjustable by the adjustment of the tension of the spring 63 of the pressure-controller 21 and also by the relative variation of the flow-restrictors or orifices 12 and 13 or 81 and 82 leading to these two parallel lines, respectively.

The zero-setting is achieved by an adjustment of the tension of the spring 63 of the pressure-controller 21 and by the relative adjustment of the flow-restrictor orifices leading to the two lines.

The system of the present invention is also adapted for piloting automatic machining or processing operations upon the work-piece being gauged, by controlling such operations by the variations in pressure in the point-of-measurement line or by the variations in the indicator line, as, for instance, through pressure-responsive electrical switches or circuits whose pressure-sensitive elements are connected with either of the aforementioned lines.

We claim the following:

1. A pneumatic system for measuring linear dimensions including a source of pneumatic pressure, a pressure-regulator, a point-of-measurement line and an indicator line, each connected to the downstream side of said pressure-regulator, variable flow-restricting means on the downstream side of said pressure-regulator for variably restricting the flow into said point-of-measurement line and into said indicator line in relation to each other, means providing a measurement-sensing orifice at the end of said point-of-measurement line, a rate-of-flow meter at the end of said indicator line and a flow controller in said indicator line arranged to vary the flow therethrough proportionally to the flow through said point-of-measurement line.

2. A pneumatic system for measuring linear dimensions, including a source of pneumatic pressure, a pressure-regulator, a point-of-measurement line and an indicator line, each connected to the downstream side of said pressure-regulator, variable flow-restricting means on the downstream side of said pressure-regulator for variably restricting the flow into said point-of-measurement line and into said indicator line in relation to each other, means providing a measurement-sensing orifice at the end of said point-of-measurement line, a rate-of-flow meter at the end of said indicator line and a flow controller in said indicator line arranged to vary the flow therethrough proportionally to the flow through said measurement line; said flow controller including a pilot chamber connected with said point-of-measurement line intermediate said measurement-sensing orifice and said variable flow-restricting means.

3. A pneumatic system for measuring linear dimensions, including a source of pneumatic pressure, a pressure-regulator, a point-of-measurement line and an indicator line, each connected to the downstream side of said pressure-regulator, variable flow-restricting means on the downstream side of said pressure-regulator for variably restricting the flow into said point-of-measurement line and into said indicator line in relation to each other, means providing a measurement-sensing orifice at the end of said point-of-measurement line, a rate-of-flow meter at the end of said indicator line and a flow controller in said indicator line arranged to vary the flow therethrough proportionally to the flow through said measurement line; said flow controller including a pilot chamber connected with said point-of-measurement line intermediate said measurement-sensing orifice and said variable flow-restricting means, a discharge chamber connected with said rate-of-flow meter, a movable partition between said two chambers, an inlet chamber connected with said variable flow-restricting means, and a valve intermediate said inlet chamber and said discharge chamber and connected with said movable partition and adjustable spring means connected with said valve.

4. A pneumatic system for measuring linear dimensions including a source of pneumatic pressure, a pressure-regulator, a point-of-measurement line and an indicator line, each connected to the downstream side of said pressure-regulator, flow-restricting means on the downstream side of said pressure-regulator for restricting the flow into said point-of-measurement line and into said indicator line, a measurement-sensing device at the end of said point-of-measurement line, a rate-of-flow meter at the end of said indicator line and a flow-controller in said indicator line arranged to vary the flow therethrough proportionally to the flow through said point-of-measurement line without bleeding air from the point-of-measurement line through the indicator line.

5. A pneumatic system for measuring linear dimensions including a source of pneumatic pressure, a pressure-regulator, a point-of-measurement line and an indicator line, each connected to the downstream side of said pressure-regulator, flow-restricting means on the downstream side of said pressure-regulator for restricting the flow into said point-of-measurement line and into said indicator line, a measurement-sensing device at the end of said indicator line and a flow-controller in said indicator line arranged to vary the flow therethrough proportionally to the flow through said point-of-measurement line without bleeding air from the point-of-measurement line through the indicator line; said flow-controller including a pilot chamber connected with said point-of-measurement line intermediate said measurement-sensing device and said variable flow-restricting means.

References Cited in the file of this patent

UNITED STATES PATENTS

| | | |
|---|---|---|
| 2,359,236 | Moore | Sept. 26, 1944 |
| 2,501,965 | Rupley | Mar. 28, 1950 |
| 2,706,397 | Byrkett | Apr. 19, 1955 |
| 2,805,568 | Baker | Sept. 10, 1957 |
| 2,831,257 | Aller | Apr. 22, 1958 |
| 2,889,704 | Baker | June 9, 1959 |